Nov. 4, 1930.  S. J. VELTON  1,780,450
AIRCRAFT MOTOR
Filed Dec. 9, 1929  3 Sheets-Sheet 1
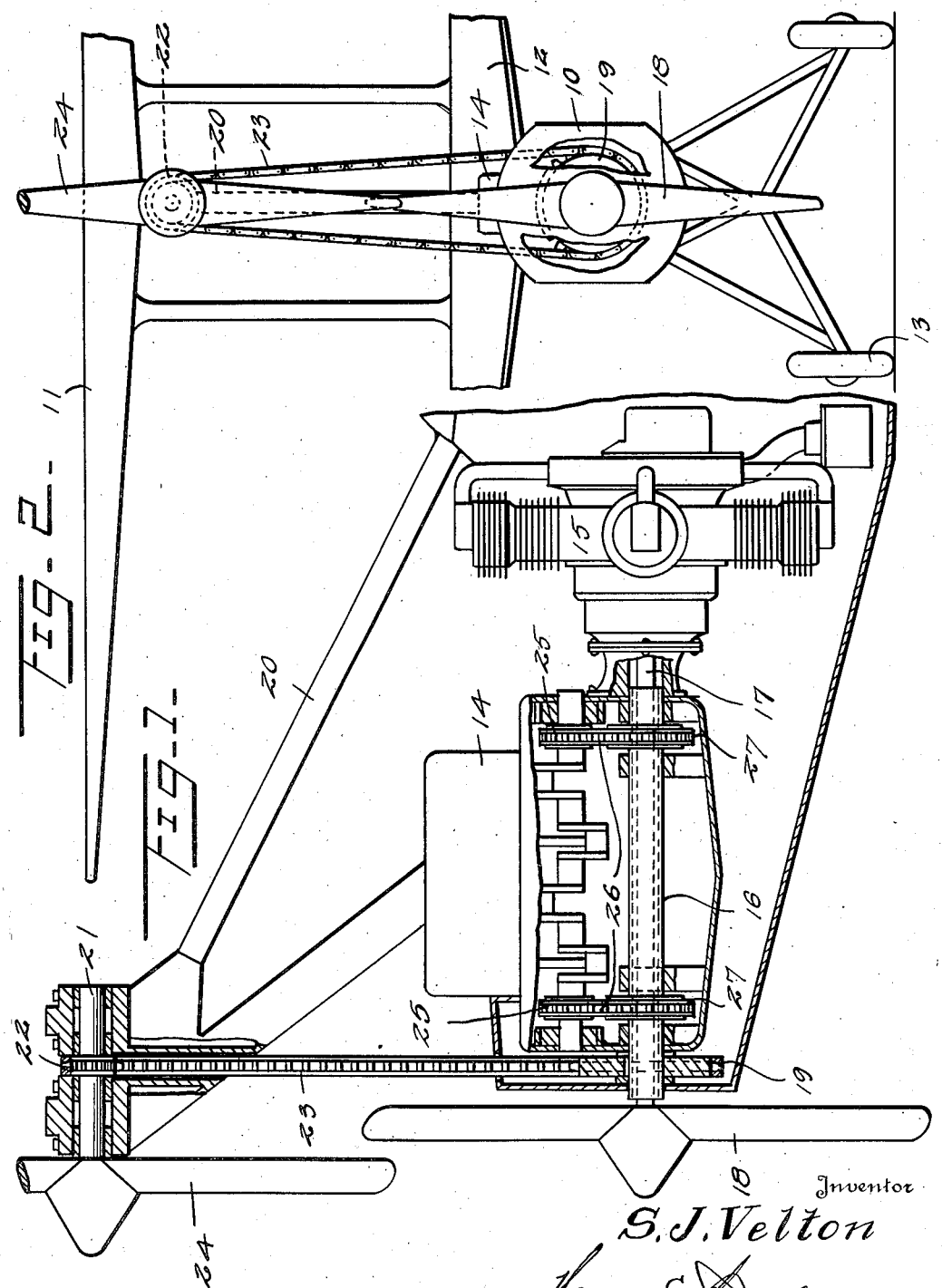
Inventor
S. J. Velton
By [signature]
Attorney Nov. 4, 1930. S. J. VELTON 1,780,450
AIRCRAFT MOTOR
Filed Dec. 9, 1929 3 Sheets-Sheet 2

Fig. 3.

Inventor
S. J. Velton
By Horace C. Sandler
Attorney

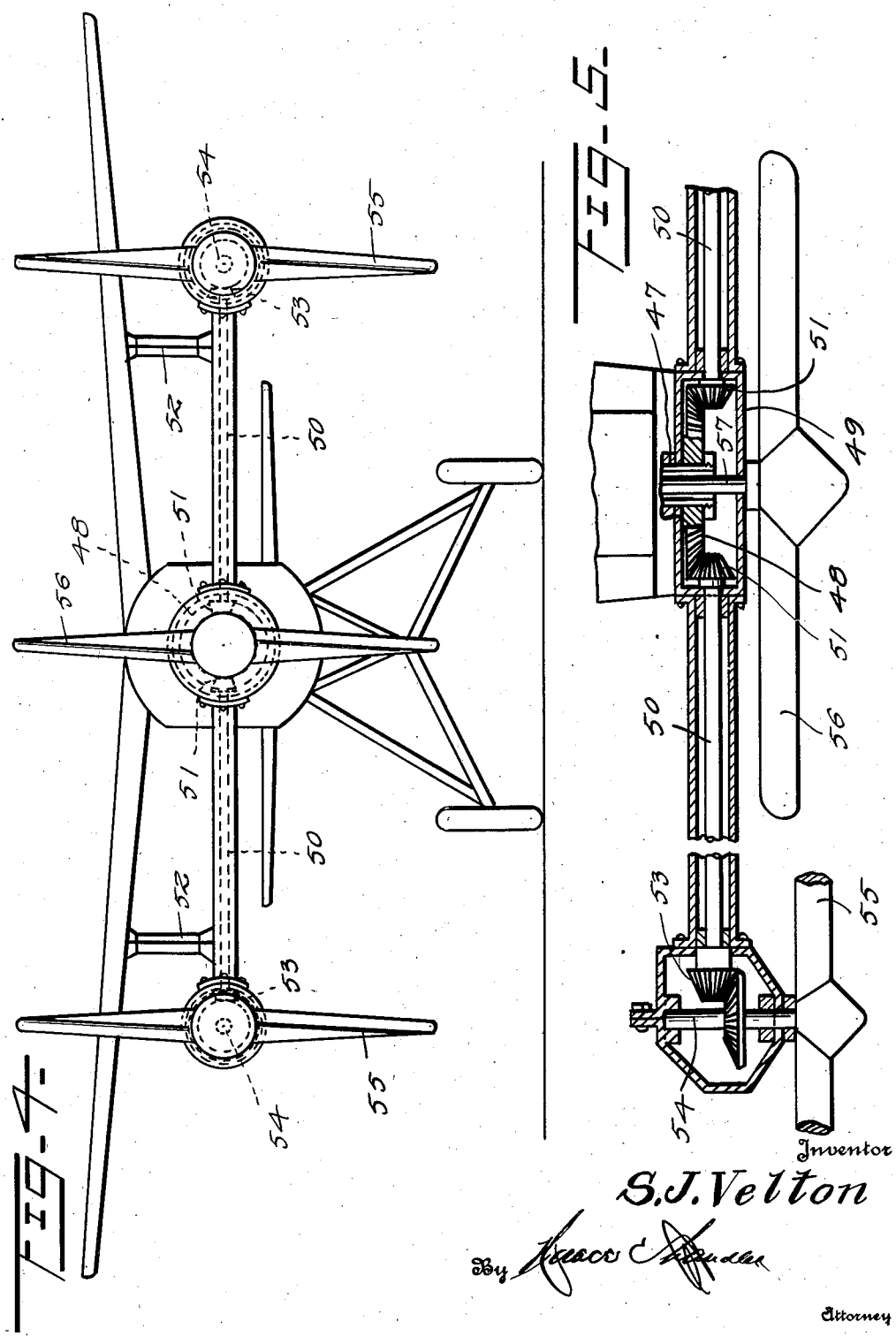

Patented Nov. 4, 1930

1,780,450

UNITED STATES PATENT OFFICE

STEPHEN JUNER VELTON, OF HOUSTON, TEXAS

AIRCRAFT MOTOR

Application filed December 9, 1929. Serial No. 412,777.

This invention relates to new and useful improvements in aircraft devices, and particularly, to motors therefor.

One object of the invention is to provide motors for aircraft which will be effective at all times, and wherein an auxiliary driving means is adapted to continue the movement of the aircraft, should the main driving means become disabled.

Another object is to provide driving motors for an aircraft wherein one or two motors may be operated simultaneously or singly.

Other objects and advantages will be apparent from the following description when taken in connection with the accompanying drawings.

In the drawings:

Figure 1 is a side elevation of a portion of an airplane, showing the invention applied thereto.

Figure 2 is a front elevation of the same.

Figure 3 is a view, similar to Figure 1, showing the use of gearing for driving the two propellers.

Figure 4 is a front elevation, showing the use of three propellers.

Figure 5 is a fragmentary top plan view of the parts shown in Figure 4, partly in section.

Referring particularly to the accompanying drawings, 10 represents a portion of the fuselage of an airplane, while 11 and 12 represent the wings or planes thereof, and 13 the landing gear.

Mounted in the forward end of the fuselage 10 are the two longitudinally alined engines 14 and 15, the shaft 16, of the forward one of which, is hollow, and receives the solid shaft 17, of the rear engine therethrough. On the forward end of the shaft 17 is a propeller 18, and on the shaft 16 a short distance rearwardly of said propeller, is a sprocket wheel 19. Extending upwardly and forwardly from the front of the fuselage 10, is a frame 20, and supported in the upper forward portion of said frame is a shaft 21, which lies directly over the forward ends of the shafts 16 and 17, and in parallel relation thereto. On this shaft 21 is a sprocket wheel 22, and engaged around this sprocket wheel, and the sprocket wheel 19, is a drive chain 23, by means of which the hollow shaft 16 drives said shaft 21. On the forward end of the shaft 21 is a propeller 24, such propeller operating in a plane slightly forward of the propeller 18, as clearly seen in Figure 1, of the drawings. On each end of the crank shaft of the forward engine 14 is a sprocket wheel 25, which drives the hollow shaft 16 by means of the chains 26, engaged with said sprockets and with the sprockets 27, on the shaft 16. Thus the engine 14 drives the upper propeller, while the engine 15 drives the lower propeller.

Referring to Figure 3, of the drawings, 28 represents the front portion of an airplane, in which are mounted the tandem arranged engines 29 and 30, the shaft of the forward one of which is hollow, as shown at 31, and receives therethrough the solid shaft 32, of the rear engine. This engine has the sprocket wheels 33 on the end portions of its crank shaft 34, while the hollow shaft 31 is provided with similar sprocket wheels 35. Drive chains are engaged around these sprockets, whereby the crank shaft drives the hollow shaft. On the forward end of the solid shaft 32 is mounted the propeller 36. On the forward end of the hollow shaft 31 is a bevel gear 37, such gear being arranged within the gear housing 38, mounted in the forward end of the fuselage, which latter is indicated by the numeral 10'. An upwardly and forwardly extending frame 20', is mounted on the front of the fuselage, and supports on its upper end the gear housing 39, a tubular casing 40 extending vertically between, and being properly connected to the housings 38 and 40. Supported in the upper housing 40 is a short horizontal shaft 41, on the forward end of which is mounted the upper propeller 42, and secured on said shaft, within the housing 40, is a bevel gear 43, which meshes with a bevel gear 44 on the upper end of a vertical shaft 45, arranged within the tubular casing 40. The lower end of the shaft 45 is provided with a bevel gear 46, meshing with the bevel gear 37. By this arrangement the forward engine 29 drives the upper propeller 42, while the rear engine 30 drives the lower propeller.

Attention is particularly called to the fact that, in each instance, the front engine is of the reciprocating type, while the rear engine is of the rotary type.

It will also be noted that the lower portion of the frame of each forward engine is provided with the supports for the hollow shaft, through which the solid shaft passes. Furthermore, the front and rear engines operate independently of each other, and may be driven separately or simultaneously. Thus, should trouble develop in one or the other of the engines, while in flight, the remaining engine will provide sufficient power to keep the airship in motion. When, however, both engines are in action, both propellers will be rotated, whereby to provide greatly increased power to drive the airship.

Referring particularly to Figures 4 and 5, there is shown a slightly different arrangement of the propellers, wherein three propellers are used, arranged in a horizontal line, across the front of the aircraft. There are two engines arranged in the same manner as shown in the other figures of the drawing, the forward engine driving the hollow shaft 47, provided with the bevel gear 48, on its front end, arranged within the housing 49. Extending through opposite sides of the housing 49 are the shafts 50, each having a bevel gear 51, on its inner end, meshing with the large or master gear 48. The outer ends of the shafts 50 are properly supported in brackets 52, carried by the outer end portions of the wings of the aircraft, and such shaft ends are provided with bevel gears 53, which mesh with similar gears carried by the shafts 54, of the propellers 55. The central propeller 56 is driven by the solid shaft 57, as shown.

What is claimed is:

The combination with the fuselage of an airplane, of a frame mounted on and extending forwardly from said fuselage, tandem motors mounted in the frame, the shafts of the motors being telescopically arranged, a casing extending upwardly from and forming part of the casing of the foremost motor, a vertical shaft in the upwardly extending casing geared to said foremost motor, a horizontal shaft in the upper end of said last-named casing driven by said vertical shaft, a propeller on said horizontal shaft, and a propeller on the forward end of the shaft of the rearmost motor.

In testimony whereof, I affix my signature.

STEPHEN JUNER VELTON.